United States Patent
de Freitas

(10) Patent No.: US 6,574,317 B1
(45) Date of Patent: Jun. 3, 2003

(54) SYSTEM AND METHOD FOR BLOCKING UNCOLLECTIBLE RANDOM TRAFFIC OF A TELECOMMUNICATION NETWORK

(75) Inventor: John E. de Freitas, Denver, CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/566,322

(22) Filed: May 8, 2000

(51) Int. Cl.[7] ............................................. H04M 15/00
(52) U.S. Cl. ........................... 379/127.02; 379/114.14; 379/120; 379/125; 379/127.01
(58) Field of Search .......................... 379/127.02, 220, 379/114.14, 115.01, 120, 121.04, 125, 127.01, 189, 220.01, 229

(56) References Cited

U.S. PATENT DOCUMENTS

| | | | | |
|---|---|---|---|---|
| 5,812,650 A | * | 9/1998 | Gammino | 379/189 |
| 5,960,071 A | * | 9/1999 | Smith | 379/114.17 |
| 5,963,625 A | * | 10/1999 | Kawecki et al. | |
| 6,205,214 B1 | * | 3/2001 | Culli et al. | |

* cited by examiner

Primary Examiner—Curtis Kuntz
Assistant Examiner—Barry W Taylor

(57) ABSTRACT

A system and method for blocking uncollectible random call traffic of a telecommunication network. The system includes a database that stores a plurality of customer and call data, a fraud detection server that extracts from the database a plurality of customer and call data pertaining to uncollectible random call traffic and generates a call block list; at least one switch lookup table; and at least one telecommunication switch located within the telecommunication network that routes or prohibits telecommunication network traffic over the telecommunication network based upon information contained in the at least one switch lookup table. The method includes the steps of providing a database; storing a plurality of customer and call data pertaining to network traffic that transits the telecommunication network in the database; extracting a plurality of customer and call data pertaining to uncollectible random call traffic from the database; generating a call block list using the plurality of customer and call data pertaining to uncollectible random call traffic, and preventing access to the telecommunication network based upon information contained in the block list.

20 Claims, 4 Drawing Sheets

SYSTEM AND METHOD FOR BLOCKING UNCOLLECTIBLE RANDOM TRAFFIC OF A TELECOMMUNICATION NETWORK

BACKGROUND

1. Field of the Invention

The present invention relates to a system and method for blocking uncollectible random traffic.in a telecommunication network, and in particular, to a system and method for reducing losses incurred from uncollectible random traffic originating from competitive local exchange carriers (CLEC) that transit a long distance telecommunication network.

2. Background of the Invention

Today, there are several large telecommunication companies which have developed and implemented, over the course of many years, an intricate network of copper and now fiber-optic cables which extend into almost every home and business.

Unfortunately, smaller companies that offer local telephone service and do not have a long distance network in place, cannot absorb the prohibitive costs of installing and maintaining a long distance network. In an attempt to increase competition and provide equal access to the nationwide and worldwide long distance networks developed by the large long distance companies, the U.S. Government enacted the Telecommunications Act of 1996. The Telecommunications Act imposed certain general duties upon the telecommunication carriers. Namely, the telecommunication carriers are under a general duty to interconnect directly or indirectly with the facilities and equipment of other carriers, and are under a general duty not to install network features, functions, or capabilities that do not comply with specified guidelines and standards. In addition, local exchange carriers (LECs) are under a duty not to prohibit resale of their services; to provide number portability; to afford access to poles, ducts, conduits and rights of way consistent with pole attachment provisions of the act; and to re-establish reciprocal compensation agreements for the transport and termination of telecommunications. Additional obligations are imposed on incumbent LECs including the duty to negotiate in good faith the terms and conditions of agreements; to provide interconnection at the same quality they provide to themselves on just, reasonable, and non-discriminatory terms and conditions; to provide access to network elements on an unbundled basis; and to offer resale of their telecommunication services at wholesale prices.

As a result of the equal access to the nations' long distance telephone networks imposed by the Telecommunications Act of 1996, the number of competitive local exchange carriers (CLEC) has increased dramatically. Long distance carriers such as MCI WorldCom, Sprint, AT&T, etc., have few, if any, billing and/or collection agreements with the ever changing number of CLECs. Thus, CLEC customers are able to randomly dial an access code to access the long distance network without remitting payment for services rendered.

Referring to FIG. 1, there is shown a diagram illustrating the flow of a long distance telephone call using a long distance telephone network, such as, for example, the MCI WorldCom network. A calling party 155 initiates a telephone call to an incumbent LEC (local exchange carrier) 150. An incumbent LEC is defined in the Telecommunications Act of 1996 as a local exchange carrier that on Feb. 8, 1996 provided a telephone exchange service in a particular area and was deemed to be a member of the exchange carrier association. Once an incumbent LEC 150 receives a phone call 110 from calling party 155, the call is placed using a long distance telecommunication network 100. Phone call 110 travels across long distance telecommunication network 100 to a destination LEC 165. Destination LEC 165 is a local exchange carrier located within the vicinity of a called party 160. Typically, the long distance carrier and the incumbent LECs 150 have billing and/or collection agreements which govern the use and access of network 100.

As a result of the government's mandate that long distance carriers provide equal access to all competitive local exchange carriers (CLEC), the number of CLECs is increasing. Consequently, the number of CLECs with which the long distance carriers have no billing and/or collection agreements is also increasing. Thus, CLEC customers are able to randomly dial an access code (i.e., 10-10-321) to access the long distance telecommunications network, without remitting payment for services rendered.

Competitive local exchange carriers (CLEC) may offer long distance services to their customers using the specific long distance networks, although many CLECs may not as yet have billing and/or collection agreements with specific networks. This uncollectible random traffic results in a net loss for the long distance carriers, as they must provide access to their long distance telecommunications network but lack appropriate billing and collection agreements with which to seek repayment for services rendered.

Therefore, there exists a need for a system and method to reduce the losses incurred from uncollectible random traffic that transits a long distance telecommunication network and originates from CLECs.

SUMMARY OF THE INVENTION

It is therefore an object of the present invention to provide a system and method for blocking uncollectible random traffic of a telecommunication network.

It is a further object of the present invention to update the long distance switches and operator service platforms with the blocked numbers to prevent further access to the telecommunication network.

To achieve the above objects, there is provided a system and method for blocking uncollectible random traffic of a telecommunication network. The system is comprised of a database which stores a plurality of customer and call information pertaining to the network traffic that transits a long distance telecommunication network. The information may contain, among other items, an automatic number identification (ANI) field that corresponds to a calling party's telephone number and/or an operating company number (OCN) field that corresponds to the identity of a calling party's local exchange carrier (LEC) or a calling party's competitive local exchange carrier (CLEC).

In addition to storing customer information, the database also stores CLEC customer data from returned, unpaid invoices. The operating company numbers are extracted from the database and may also correspond to companies with which the long distance carrier does not have a billing agreement in place. Those OCNs are then extracted to a file and sent to long distance switches and operator service platforms. In this manner, CLECs which do not have billing and/or collection agreements with the long distance carrier may be prohibited from using the long distance operator services and the telecommunication network.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
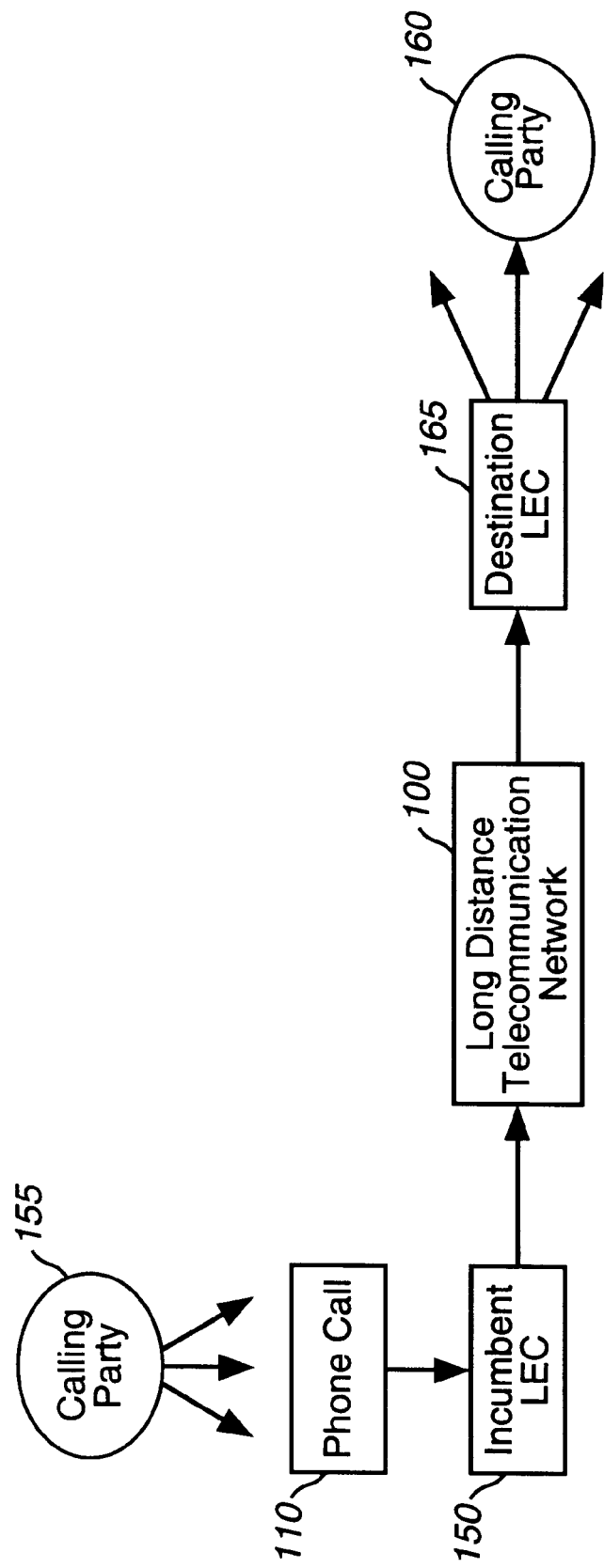
FIG. 1 is a diagram illustrating the flow of a long distance telephone call initiated by a calling party to a called party via a destination local exchange carrier.
Figure 2:
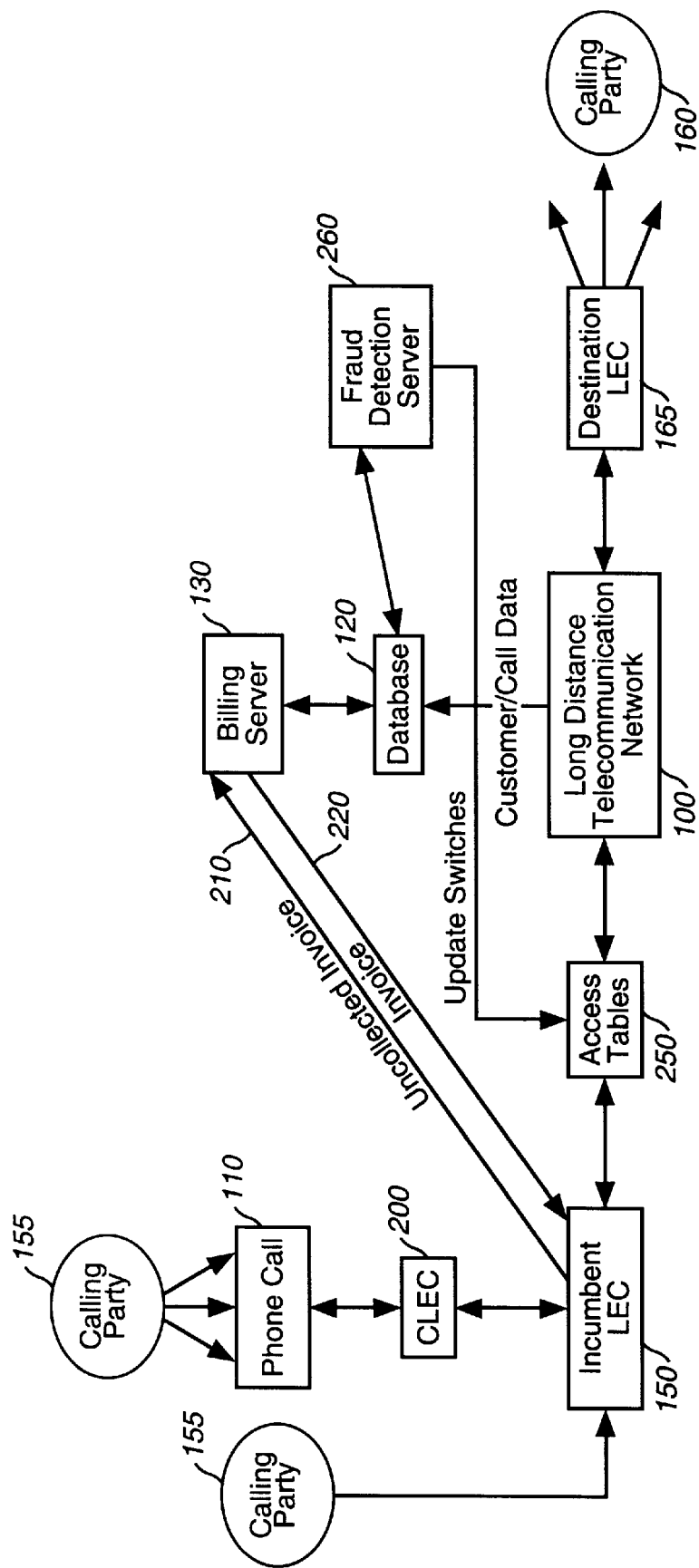
FIG. 2 is a diagram illustrating a system for blocking uncollectible random traffic initiated by a calling party through a competitive local exchange carrier (CLEC) according to the present invention.

Referring to FIG. 2, there is shown a diagram illustrating a system for blocking uncollectible random traffic of a telecommunications network according to the present invention. For the sake of simplicity, the system is shown and described as proceeding from the calling party to the called party. It is understood, however, that the call may proceed in the opposite direction, having a similar structure as previously described.

When calling party 155 initiates a phone call 110 with a CLEC 200, the call is routed to an incumbent LEC 150. The phone call 110 is then either allowed or denied access to the long distance telecommunications network 100 based upon entries in an access table 250. If access table 250 does not contain the automatic number identification (ANI), i.e., telephone number or the operating company number (OCN), phone call 110 is permitted access to network 100. Phone call 110 traverses network 100 and reaches destination LEC 165. If access table 250 does contain the Automatic Number Identifier (ANI), the call is not switched and is denied access to network 100.

Upon completion of the call, a network database 120 records customer information and call data pertaining to the phone call 110. A network billing server 130 interfaces with the network database 120, generates an invoice 220 and transmits invoice 220 to incumbent LEC 150. Incumbent LEC 150 then bills CLEC 200 for the invoice. If invoice 220 is returned uncollected, an uncollected invoice 210 will be returned to the billing server 130. The customer information pertaining to the uncollected invoice will be stored in network database 120. A fraud detection server 260 extracts the OCN and the ANI information, in addition to customer information, pertaining to the uncollected invoices. Fraud detection server 260 may be either a stand alone server or run as a process on a mainframe computer. This extracted information is stored in a file and sent to access table 250. The updated information in access table 250 prevents the unauthorized use of network 100 for all future calls by determining whether or not the calls are to be switched. As a result, certain calls may be denied access to network 100.

Figure 3:
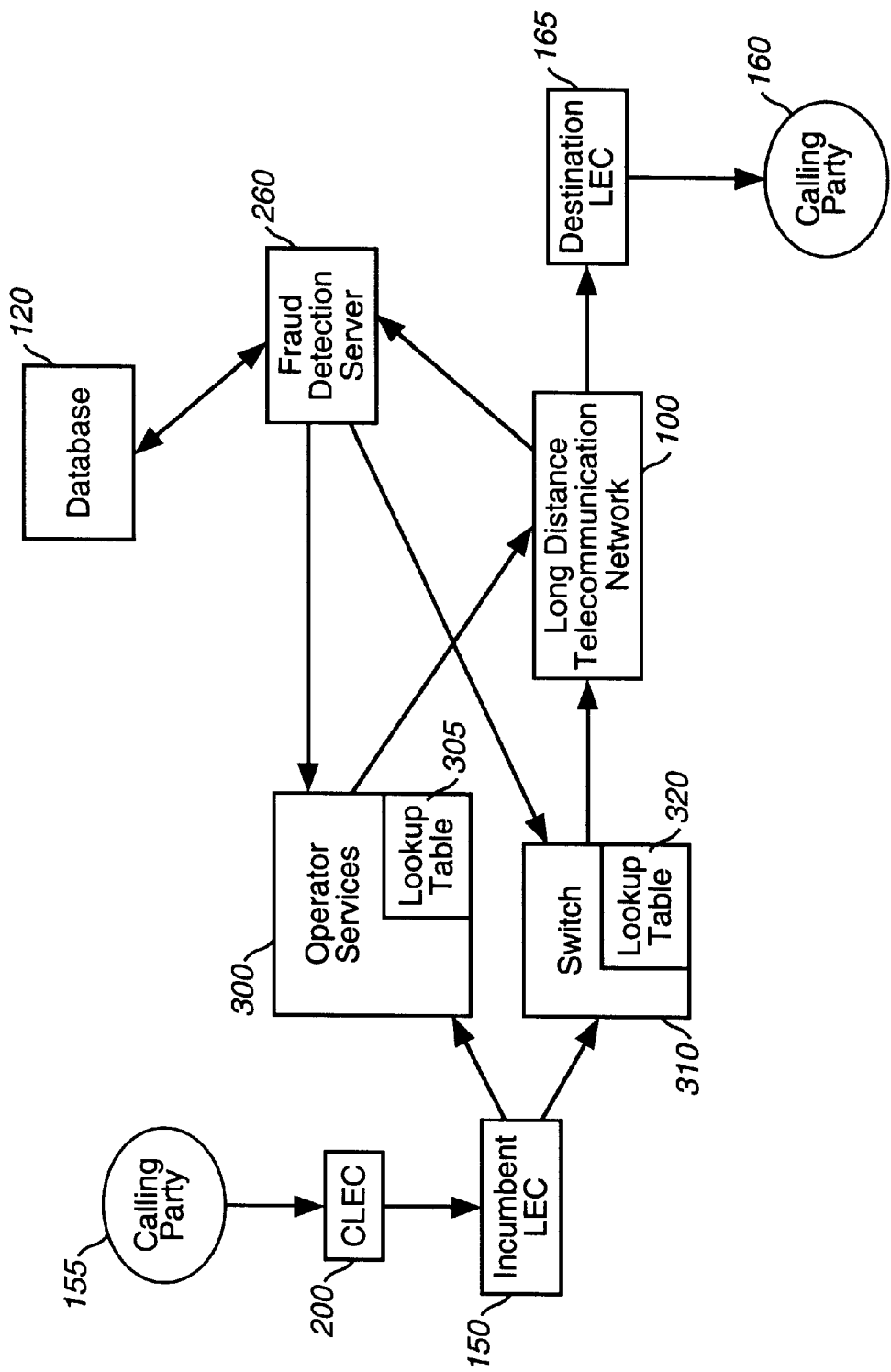
FIG. 3 is a diagram illustrating a method for updating lookup tables associated with operator services and telecommunications switches according to the present invention.

Referring to FIG. 3, there is shown a diagram illustrating the system for updating access table 250 with the new uncollected invoice information. Typically, there are two, ways in which a calling party 155 places a long distance call through a CLEC 200. In the first instance, calling party 155 may require operator assistance and access an operator service platform 300. In this instance, the operator receives an incoming phone call 110 from calling party 155 requesting assistance in placing call 110. The assistance may vary from finding a long distance number to actually dialing the number and connecting the two parties. In either case, prior to assisting the customer, the incoming call/customer data is compared to operator services lookup table 305. If the customer/call data matches an entry in table 305, the operator denies assistance and prohibits access to network 100. If the customer/call data does not match, (i.e. not blocked) the operator may place the long distance call and bill the calling party 155 accordingly.

In the second instance, calling party 155 may dial directly to the called party 160. In this case, the telephone call is routed through a telecommunications switch 310. Switching is the ability to route calls to different locations within the public phone network on a call by call basis rather than limiting transmission between predetermined fixed points. For example, a call from New York to Los Angeles may be routed through Chicago in one instance and through Atlanta and Denver in another. At each point in the network where lines converge, a switch 310 is placed. The switch makes, breaks, or changes connections among the phone circuits in order to route calls to their destination. The act of breaking a phone circuit effectively prevents access to network 100.

In both accessing operator services platform 300 and routing the call through switch 310, the ANI is compared to an operator lookup table 305 or a switch lookup table 320, respectively. If either the OCN or ANI number matches a corresponding entry in lookup table 305 or lookup table 320, the call is not permitted access to network 100. The system for updating operator services platform 300 and switch 310 operates as follows. Fraud detection server 260 extracts a plurality of customer and call data from database 120 pertaining to uncollectible random call traffic. The customer and call data may contain an ANI or OCN number relating to each call placed using network 100. The ANI and OCN numbers are gathered from unpaid invoices 210 and stored in database 120. Periodically, the extracted information is stored in a file, usage flags may be added, and the file is sent electronically to operator services lookup table 305 and switch lookup table 320. The usage flags correspond to what action should be performed for each number in the file An example of some of the actions are: blocking direct calls, blocking operator services, blocking collect calls, blocking call back features, and removing the number from the block lists. Upon receipt, the new customer information is incorporated into lookup tables 305 and 320. The updated tables thus contain the latest customer information pertaining to calls which are blocked from using operator services or the long distance network 100. In this manner, CLECs, and their customers, who do not have billing and/or collection agreements with the long distance carrier are prohibited from accessing the network 100. As a result, the losses incurred due to the random uncollectible traffic are curtailed.

Figure 4:
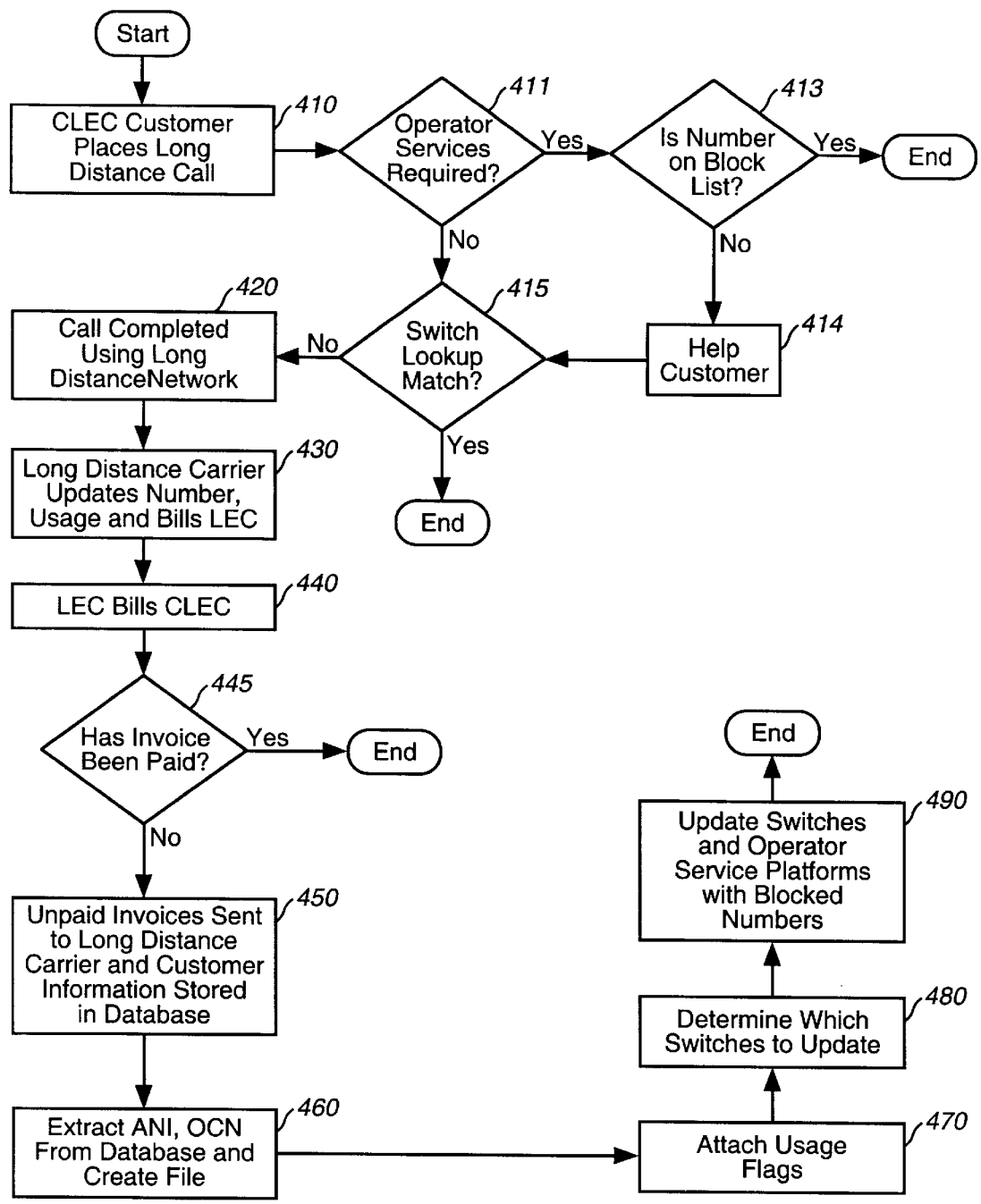
FIG. 4 is a flowchart illustrating the method for blocking uncollectible random traffic of a telecommunication network according to the present invention.

Referring now to FIG. 4, there is shown a method for blocking uncollectible random traffic of a telecommunications network according to the present invention. A CLEC customer places a long distance call in step 410. It is then determined whether or not operator services are required in step 411. If operator services are required, the ANI number is compared with operator lookup table 305 in step 413. If the ANI number is found in the operator lookup table, the process ends and the call is not permitted access to long distance network 100. If the number is not found on the list, the operator may assist the caller in step 414 and place the long distance telephone call. If either operator services are not required in step 411 or the operator assists the customer in placing the call in step 414, the call data (i.e., the ANI) is then compared with switch lookup table 320 in step 415. If there is a match, the procedure ends and the call is not permitted access to network 100. If, however, there is no corresponding entry in switch lookup table 320, the call is completed using the long distance network in step 420. Upon completion of the call, the long distance carrier updates the telephone number, customer information, and call usage, and submits an invoice to LEC 150 in step 430. The LEC 150 bills the CLEC 200 in step 440 provided the call originated through a CLEC.

Referring to step 445, it is determined whether or not the invoice was paid by the CLEC. If the invoice was paid, the procedure ends. If the invoice was not paid, however, the unpaid bill is forwarded to the long distance carrier and the customer information and invoice information is stored in network database 120 in step 450. Proceeding to step 460, the ANI and OCN information is extracted from the database 120 and a file is created containing the information. Certain information flags are added to the individual ANI and OCN numbers in step 470. The information flags correspond to what action should be performed for each number. An example of some of the actions are: blocking direct calls, blocking operator services, blocking collect calls, blocking call back features, and removing the number from the block lists.

After the appropriate flags are set in step 470, it is determined in step 480 which local switches require updating. In an attempt to reduce the delay associated with the switch lookup tables, only the switches in the immediate vicinity of the calling party are updated with the blocked numbers. Therefore, switches in the remaining portion of the country do not contain the additional entries in the switch lookup table. After the appropriate switches are determined, the switch lookup tables and the operator lookup tables are updated with the most current blocked numbers in step 490.

As a direct result of updating the operator lookup tables 305 and the switch lookup tables 320 with the most current information pertaining to CLECs who do not have billing and/or collection agreements with the long distance carrier, the carrier is able to reduce the amount of random uncollectible traffic which traverses its network 100.

While the present invention has been described in connection with the accompanying attached drawings, it will be readily apparent to those skilled in the art that various changes and modifications may be made thereunto without departing from the spirit and scope of the present invention as defined by the appended claims.

What is claimed is:

1. A system for blocking uncollectible random call traffic of a telecommunication network, comprising:

a database for storing a plurality of customer and call data including an operating company number (OCN) that corresponds to an identity of a calling party's local exchange carrier (LEC) or a calling party's competitive local exchange carrier (CLEC);

a fraud detection server for generating a call block list based on at least the operating company number; and at least one telecommunication switch located within the telecommunication network for prohibiting telecommunication network traffic over the telecommunication network based upon said call block list.

2. The system according to claim 1, further comprising at least one switch lookup table containing having call blocking options and located within said at least one telecommunication switch.

3. The system according to claim 1, further comprising a billing server for receiving uncollected invoices and for storing said plurality of customer and call data pertaining to said uncollected invoices in said database.

4. The system according to claim 2, wherein said at least one switch lookup table includes said call block list.

5. The system according to claim 1, wherein said plurality of customer and call data further comprises:

an automatic number identification (ANI) field that corresponds to a calling party's telephone number.

6. A system for blocking uncollectible random call traffic of a telecommunication network, comprising:

a fraud detection server for extracting customer and call data including an operating company number (OCN) that corresponds to an identity of a calling party's local exchange carrier (LEC) or a calling party's competitive local exchange carrier (CLEC) and for generating a call block list based on at least the operating company number; and at least one operator services platform having access to the telecommunication network, and for assisting placement of a long distance call from a calling party seeking access to the telecommunication network based upon said call block list.

7. The system according to claim 6, further comprising a billing server for receiving uncollected invoices and for storing said plurality of customer and call data pertaining to said uncollected invoices in said database.

8. The system according to claim 6, further comprising at least one operator services lookup table containing call blocking options and including said call block list.

9. The system according to claim 6, wherein said plurality of customer and call data further comprises:

an automatic number identification (ANI) field that corresponds to a calling party's telephone number.

10. A method for blocking uncollectible random call traffic of a telecommunication network comprising the steps of:

generating a call block list based on at least an operating company number (OCN) that corresponds to an identity of a calling party's local exchange carrier (LEC) or a calling party's competitive local exchange carrier (CLEC) and extracted from customer and call data pertaining to uncollectible random call traffic;

preventing access to the telecommunication network based on the call block list.

11. The method according to claim 10, further comprising the steps of:

receiving an uncollectible invoice; and storing said customer and call data pertaining to said uncollected invoice in a database.

12. The method according to claim 10, wherein the customer and call data includes:

an automatic number identification (ANI) field that corresponds to a calling party's telephone number.

13. The method according to claim 10, wherein said step of preventing access to the telecommunication network, further comprises the steps of:

providing at least one telecommunication switch within the telecommunication network having a switch lookup table;

updating said switch lookup table based on said call block list; and denying access to the telecommunication network by not switching the network traffic if said customer and call data pertaining to the network traffic is present in said switch lookup table.

14. The method according to claim 10, wherein said step of preventing access to the telecommunication network, further comprises the steps of:

providing at least one operator services platform having access to the telecommunication network, said operator services platform providing information and assistance in completing a long distance call from a calling party, said platform having said operator services lookup table;

updating said operator services lookup table based on said call block list; and denying access to said operator services platform if said customer and call data pertaining to the network traffic is present in said operator lookup table.

15. A method for blocking uncollectible random call traffic of a telecommunication network, comprising:

receiving a plurality of call data pertaining to uncollectible random call traffic;

generating a plurality of switch lookup tables stored in a respective plurality telecommunication switches, said switch lookup tables including call block lists based on the call data for prohibiting telecommunication network traffic over said telecommunication network based on said switch lookup tables;

receiving further call data pertaining to further uncollectible random call traffic; and updating only respective call block lists of respective switch lookup tables of respective telecommunication switches that provide access to a calling party's competitive local exchange carrier (CLEC) that generated the uncollectible random call traffic.

16. A method for blocking uncollectible random call traffic of a telecommunication network, comprising:

receiving a plurality of call data pertaining to uncollectible random call traffic and including an operating company number (OCN) that corresponds to an identity of a calling party's local exchange carrier (LEC) or a calling party's competitive local exchange carrier (CLEC);

generating an operator lookup table stored in an operator service center;

including in said operator lookup table a global call block list based on at least the operating company number;

generating a plurality of switch lookup tables stored in a respective plurality of telecommunication switches;

including in said switch lookup tables respective local call block lists based on a portion of said global call block list;

determining if operator services are required for a received call;

if it is determined that said received call requires operator services, prohibiting said received call based on said global call block list of said operator lookup table; and if it is determined that said received call does not require operator services, prohibiting said received call based on a respective switch lookup table corresponding to a geographic location of said received call.

17. The method of claim 16, further comprising:

receiving further call data pertaining to further uncollectible random call traffic;

updating said global call block list of said operator lookup table based on said further call data;

updating only respective local call block lists of respective switch lookup tables of respective telecommunication switches that provide access to a calling party's competitive local exchange carrier (CLEC) that generated the uncollectible random call traffic.

18. A method for blocking uncollectible random call traffic of a telecommunication network, comprising:

receiving call data pertaining to uncollectible random call traffic and including an operating company number (OCN) that corresponds to an identity of a calling party's local exchange carrier (LEC) or a calling party's competitive local exchange carrier (CLEC);

generating a plurality of call block lists based on at least said operating company number; and prohibiting telecommunication network traffic over said telecommunication network based on said call block lists.

19. The method of claim 18, further comprising:

adding usage flags to said call block lists, said usage flags corresponding to actions to be performed for numbers called within said call block lists.

20. The method of claim 19, wherein said actions to be performed include blocking of direct calls, blocking of operator services, blocking of collect calls, blocking of call back features, and removal of call blocking, for respective entries in said call block lists.

* * * * *